(12) United States Patent
Thibodeau et al.

(10) Patent No.: US 7,525,913 B2
(45) Date of Patent: Apr. 28, 2009

(54) SYSTEM AND METHOD FOR PROVIDING GAPS BETWEEN DATA ELEMENTS AT INGRESS TO A NETWORK ELEMENT

(75) Inventors: Mark Jason Thibodeau, Nepean (CA); John William Galway, Nepean (CA); Jason Sterne, Ottawa (CA); Michael Wayne Mitchell, Ottawa (CA); Peter Donovan, Orleans (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 903 days.

(21) Appl. No.: 10/195,492

(22) Filed: Jul. 16, 2002

(65) Prior Publication Data

US 2003/0112757 A1 Jun. 19, 2003

(30) Foreign Application Priority Data

Dec. 19, 2001 (CA) .................................. 2365688

(51) Int. Cl.
   *H04L 12/26* (2006.01)
   *H04L 12/56* (2006.01)
(52) U.S. Cl. ...................................... 370/231; 370/415
(58) Field of Classification Search ........................ None
   See application file for complete search history.

(56) References Cited

U.S. PATENT DOCUMENTS

| 5,353,285 | A  | * | 10/1994 | Van Der Plas et al. ...... 370/443 |
| 5,570,361 | A  | * | 10/1996 | Norizuki et al. .......... 370/395.2 |
| 5,777,984 | A  | * | 7/1998  | Gun et al. .................... 370/230 |
| 5,787,072 | A  | * | 7/1998  | Shimojo et al. ............. 370/231 |
| 5,790,521 | A  | * | 8/1998  | Lee et al. .................... 370/230 |
| 5,790,545 | A  | * | 8/1998  | Holt et al. ................... 370/398 |
| 5,862,127 | A  | * | 1/1999  | Kwak et al. ................. 370/233 |
| 6,052,376 | A  | * | 4/2000  | Wills .......................... 370/419 |
| 6,201,792 | B1 | * | 3/2001  | Lahat ......................... 370/236 |
| 6,215,768 | B1 | * | 4/2001  | Kim ............................ 370/230 |
| 6,226,306 | B1 | * | 5/2001  | Yajima et al. ............... 370/538 |
| 6,407,983 | B1 | * | 6/2002  | Zheng et al. ................ 370/232 |
| 6,504,824 | B1 | * | 1/2003  | Tanaka et al. ............... 370/252 |
| 6,791,943 | B1 | * | 9/2004  | Reynolds ..................... 370/232 |
| 6,888,824 | B1 | * | 5/2005  | Fang et al. ................... 370/359 |
| 6,975,638 | B1 | * | 12/2005 | Chen et al. .................. 370/412 |
| 2002/0194321 | A1 | * | 12/2002 | Yaseen et al. ............... 709/223 |

\* cited by examiner

*Primary Examiner*—Edan Orgad
*Assistant Examiner*—Blanche Wong

(57) ABSTRACT

The invention provides a system and method of controlling timing of release of traffic for a communication switch. The traffic originates from at least one source, is directed to a common ingress point of the switch and is directed to a common egress point in the switch. The egress point has a maximum egress transmission rate. The traffic has at least one datastream. Each datastream has a requested transmission rate. The method comprises, for each datastream, establishing a maximum cell release rate such that a sum of each of the maximum cell release rate does not exceed the maximum egress transmission rate and utilizing the maximum cell release rate to govern release of local traffic in the datastream from the ingress point.

17 Claims, 7 Drawing Sheets

SYSTEM AND METHOD FOR PROVIDING GAPS BETWEEN DATA ELEMENTS AT INGRESS TO A NETWORK ELEMENT

FIELD OF THE INVENTION

The invention relates to a system and method providing traffic management of cells being processed by a network element.

BACKGROUND OF INVENTION

In a communication switch, a switch fabric is provided. The switch fabric may be implemented as a conventional cell space switch whereby cells are received at any of N input ports and switched to any of N output ports through a connection. The design of such fabrics are rather simple, and typically include buffering at each output port. Buffering within the fabric may not be adequate, depending on demands from periphery subsystems, resulting in loss of data cells at the fabric.

Backpressure is a well-known feedback technique to reduce or prevent cell loss when the switch fabric experiences congestion. The fabric sends a Backpressure Indication (feedback message) for a congested output port to the peripheral subsystem, which in response holds back sending cells destined to that port. Typically all input ports which are connected to the output port receive the same backpressure signal. Accordingly it is desirable to minimize the need for backpressure signalling.

For example, in a typical N×N switching architecture, the use of backpressure would allow congestion in the switching fabric to "push-back" to the input port. When an input port receives a backpressure indication from an output port, the input port stops sending data transmissions to the output port. While Quality of Service (QoS) standards for transmission rates are ensured using backpressure signalling, the use of backpressure signalling is disruptive to the traffic flow for an input port.

There is a need for a system and method for regulating cell traffic to reduce the generation I/O of backpressure signals that improves upon prior art systems.

SUMMARY OF INVENTION

In a first aspect, a method of controlling timing of release of traffic provided to a communication switch is provided. The traffic originates from at least one source, is directed to a common ingress point of the switch and is directed to a common egress point in the switch. The egress point has a maximum egress transmission rate. The traffic comprises at least one datastream. The method comprises for each datastream, establishing a maximum cell release rate such that a sum of each maximum cell release rate does not exceed the maximum egress transmission rate, and for each datastream, utilizing the maximum cell release rate to govern release of local traffic the datastream from the ingress point.

The method may have the common ingress point as a queue in an ingress line card and the common egress point as an egress line card.

The method may have the release of local traffic further governed by a backpressure indication of traffic for the datastream.

The method may have the release of the traffic further governed by an indication of availability of local traffic for the datastream to be transmitted at the ingress point.

In a second aspect, a circuit for controlling timing of release of traffic for a communication switch is provided. The traffic originates from at least one source, is directed to a common ingress point of the switch and is directed to a common egress point in the switch. The egress point has a maximum egress transmission rate. The traffic comprises at least one datastream. The circuit comprises at the ingress point, for each datastream, a counter module adapted to generate a local traffic pulse signal to control release of local traffic of the datastream. The local traffic pulse signal provides a limited release rate for the local traffic of the datastream. The limited release rate is defined by the maximum egress transmission rate, such that a sum of all limited release rates for all datastreams does not exceed the maximum egress transmission rate.

The circuit may have for each datastream, a second counter module adapted to generate a local traffic release signal utilizing the local traffic pulse signal. The local traffic release signal is generated when traffic is available in the datastream.

The circuit may have the local traffic release signal generated when there is no backpressure in the datastream.

The circuit may further comprise a shaper associated with an output of said second counter module for traffic from each datastream.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
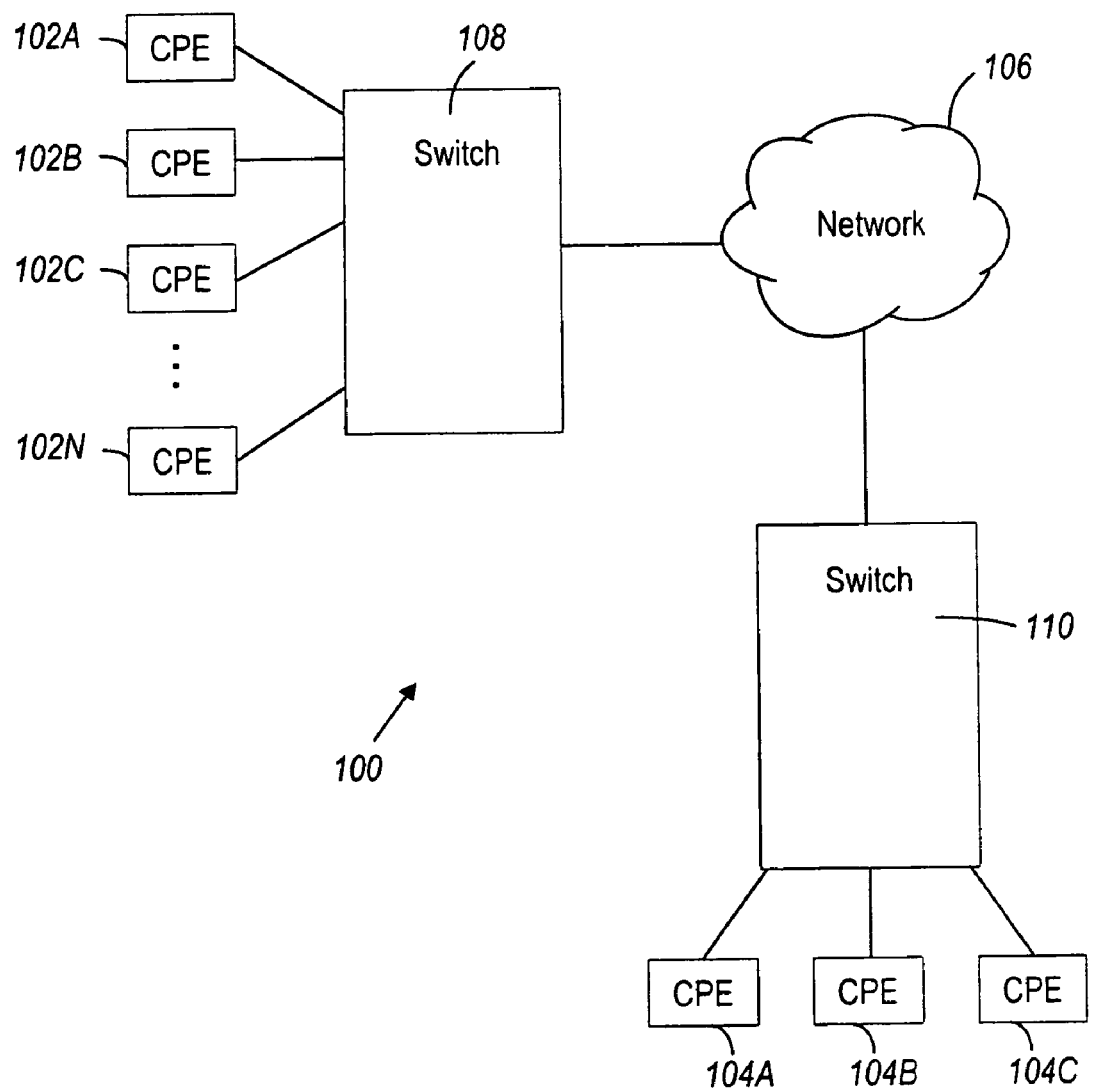
FIG. 1 is a block diagram of a communication network utilizing a network element embodying the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

System Architecture

Following is a description of a network element associated with the embodiment. Referring to FIG. 1, a communication network 100 is shown. Network 100 allows devices 102A, 102B, 102C ... 102N to communicate with devices 104A, 104B and 104C through network cloud 106. At the edge of network cloud 106, switch 108 is the connection point for devices 102A ... 102N to network cloud 106. Similarly, switch 110 connects devices 104A, 104B and 104C to another edge of network cloud 106.

Switches 108 and 110 incorporate the traffic shaping system of the embodiment. It will be appreciated that terms such as "routing switch", "communication switch", "communication device", "switch", "network element" and other terms known in the art may be used to describe switch 108. Further, while the embodiment is described for switch 108, it will be appreciated that the system and method described herein may be adapted to any data switching system.

Figure 2A:
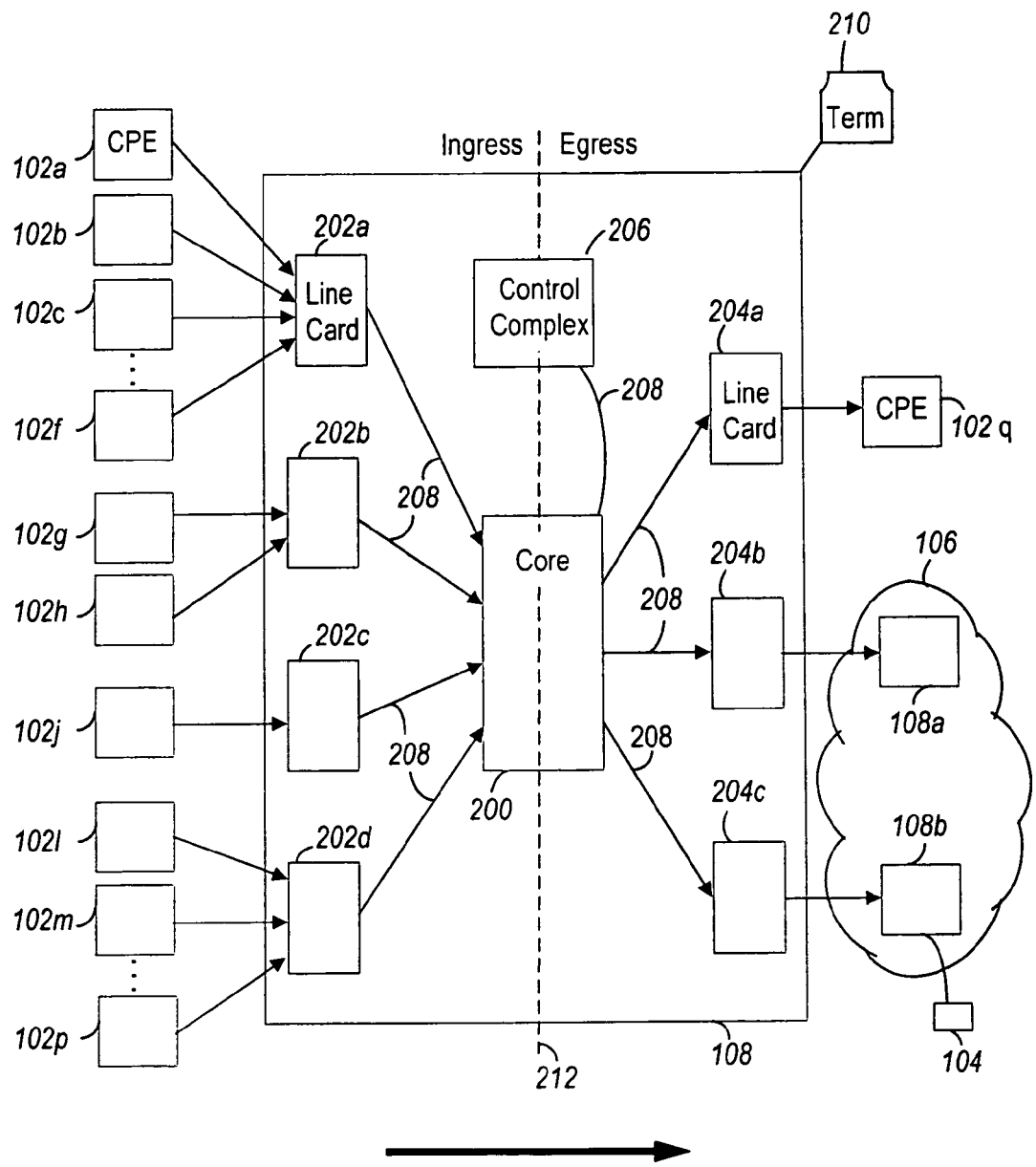
FIG. 2A is a block diagram of components of the network element and its connected devices of FIG. 1.

Referring to FIG. 2A, switch 108 is a multi-protocol backbone system, which can process both ATM cells and IP traffic through its same switching fabric. Switch 108 comprises a switching core 200, or fabric, ingress line cards 202 and egress line cards 204. The various line cards and components in switch 108 communicate with each other through data links. Switching fabric 200 provide cell switching capacity for switch 108 from its input ports to its output ports. Ingress line cards 202 provide input ports for I/O to switch 108, allowing connection of devices, like customer premise devices (CPEs) 102A, 102B, and 102C to switch 108. A separate control complex 206 provides central management for switch 108.

Egress line cards 204 provide outputs ports for I/O to switch 108. The output ports may connect to other CPEs 102 or they may connect to other network elements 108 in cloud 106, thereby providing an access point to CPEs 104.

It will be appreciated that for the particular configuration I/O of switch 108 shown, the ingress direction for traffic flow relative to core 200 is from CPEs 102 through line cards 202 to core 200 and the egress direction of traffic flow is from core 200 to line cards 204 to other elements 102q or other switches 108. Dotted line 212 demarks the border of the ingress and egress sides of switch 108 with the ingress side of switch 108 on the left side and the egress side the right side of line 212.

In the embodiment, each input port on ingress line card 202 has a throughput capacity set according to OC-48 bandwidth standards and each output port on egress line card 204 has a throughput capacity set according to OC-3 bandwidth standards. It will be appreciated that other bandwidth capabilities may be provided on either the ingress or egress sides.

Other elements of switch 108 include communication links which enable switching shelves 200, line cards 202 and 204 and the control complex 206 to communicate data and status information with each other. High Speed Inter Shelf Links (HISL) 208 link control complex with switching fabric 200. HISLs 208 also link switching fabric shelves 200 with line cards 202 and 204. Terminal 210 is connected to switch 108 and runs controlling software, which allows an operator to modify, and control the operation of, switch 108.

Figure 2B:
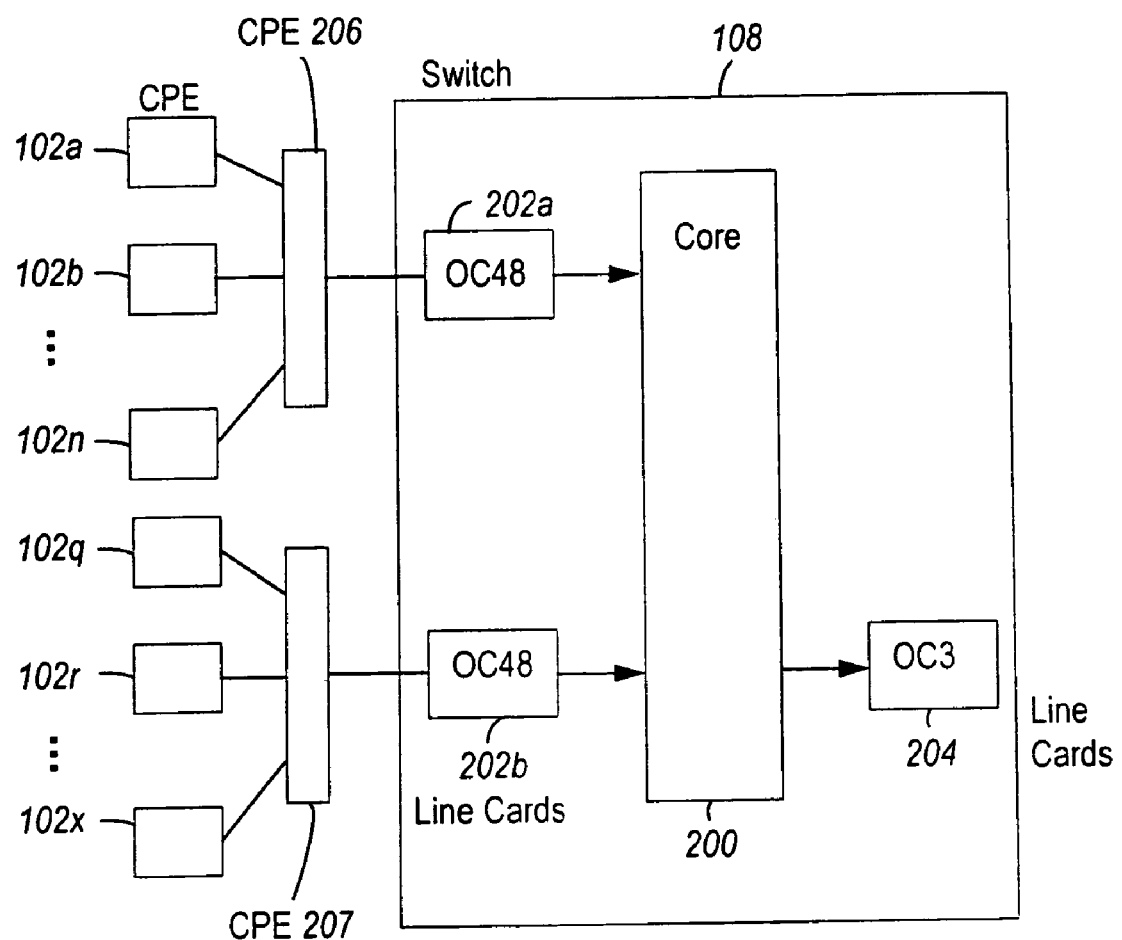
FIG. 2B is a block diagram of selected components of the network element of FIG. 2A.

Following is a description of backpressure issues associated with switch 108. FIG. 2B represents a portion of switch 108 showing fabric 200 connected on the ingress side by line cards 202A and 202B and connected on the egress side to line card 204. CPEs 102A, 102B ... 102N are connected to line card 202A. CPEs 102Q, 102R ... 102X are connected to line card 202B. Each line card 202A and 202B have a bandwidth capacity according to OC-48 standards. Meanwhile, the egress line card 204 has bandwidth capacity according to OC-3 standards. Accordingly, if both line cards 202A and 202A are providing ingress data to core 200 at their full bandwidth potentials, and if both line cards 202A and 202B are directing all of their traffic to a connection to line card 204, egress line card 204 will become congested and will not be able to process all of the traffic provided to it and would generate backpressure signals to each of line cards 202A and 202B. Upon the initial of backpressure signals by egress line card 204, each of line cards 202A and 202B would react to the backpressure signals by stop sending their data until the signals are released.

Accordingly, the embodiment provides a mechanism wherein each line card 202A and 202B can individually shape their traffic from their respective CPEs 102A ... 102N and 102Q ... 102X to minimize the production of backpressure signals. The shaping of the traffic is implemented by providing a guaranteed minimum inter-cell gap between cells transmitted by line card 202 into core 200. Traffic may be referred to as a datastream for a particular source.

Figure 6:
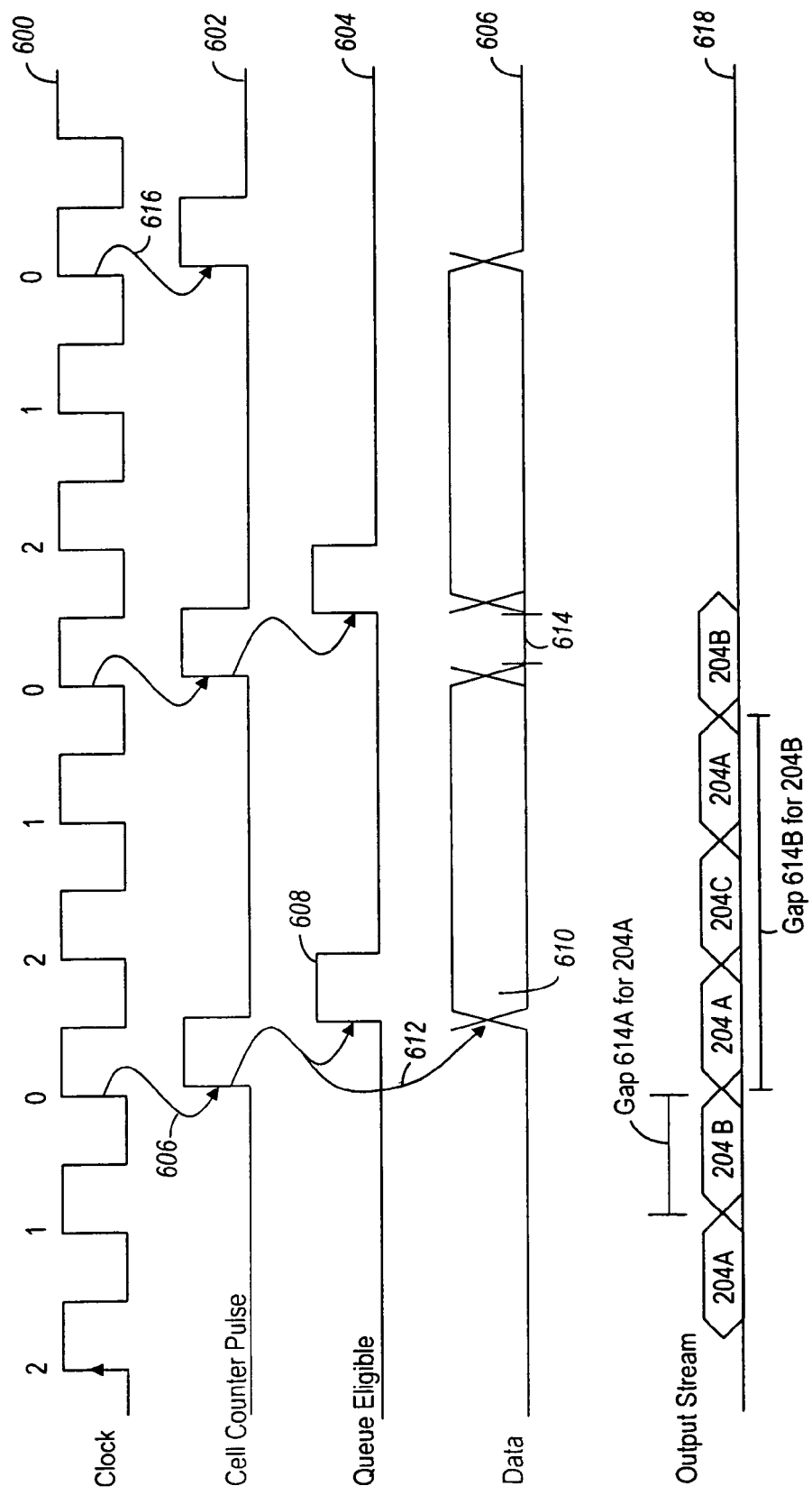
FIG. 6 is a timing diagram of cell traffic processed by the traffic shaper of FIG. 5.

Referring to FIG. 6, the minimum inter-cell gap provisioning by the embodiment is shown. Graph 604 represents a time line on the X-axis showing representative cells from CPEs 102A, 102B ... 102N shaped by line card 202A and transmitted onto HISL 208. Cells are represented by blocks 612. The line card 202A, selects traffic from each of the CPEs 102A, 102B, ... 102N and inserts it into its transmitted data stream. However, the embodiment inserts a gap of time 610 between each cell 612 from the same CPE in order to provide a minimum guaranteed inter-cell gap. The minimum gap equates to a maximum speed throughput for the line card. Further detail on the insertion and timing of the gap 610 and FIG. 6 are provided later.

Referring to FIG. 2B, the following example illustrates how the embodiment may limit bandwidth to its associated CPEs to attempt to reduce backpressure signalling. Referring to line card 202A, it is presumed for the example that the following CPEs have the noted bandwidth capacities:

| CPE | Bandwidth |
| --- | --- |
| 102A | 7 Mbps |
| 102B | 5 Mbps |
| 102N | 6 Mbps |

For the example, line card 204 is receiving all the traffic from the CPEs and has a limit of 6 Mbps. Line card 202A determines that the total bandwidth requested by CPEs 102A ... 102N exceeds bandwidth the capacity of line card 204. Accordingly, the embodiment limits the cumulative traffic from CPEs 102A ... 102N to 5 Mbps. The line card 202A may apportion the bandwidth of the connected CPEs as follows:

| CPE | Restricted Bandwidth |
| --- | --- |
| 102A | 3 Mbps |
| 102B | 1 Mbps |
| 102N | 1 Mbps |
| Total | 5 Mbps |

Accordingly, backpressure signalling would not be generated by line card 204.

Similarly, line card 202B has another independent system which regulates the bandwidth provided to each of its connected CPEs 102Q, 102R ... 102X. The embodiment enables independent programming of bandwidth restrictions to individual line cards 202.

The embodiment also allows line cards 202A and 202B to absorb local backpressure traffic from each of its connected CPEs. However, if the local backpressure traffic persists for too long of a time, the embodiment would discard the traffic.

Figure 3:
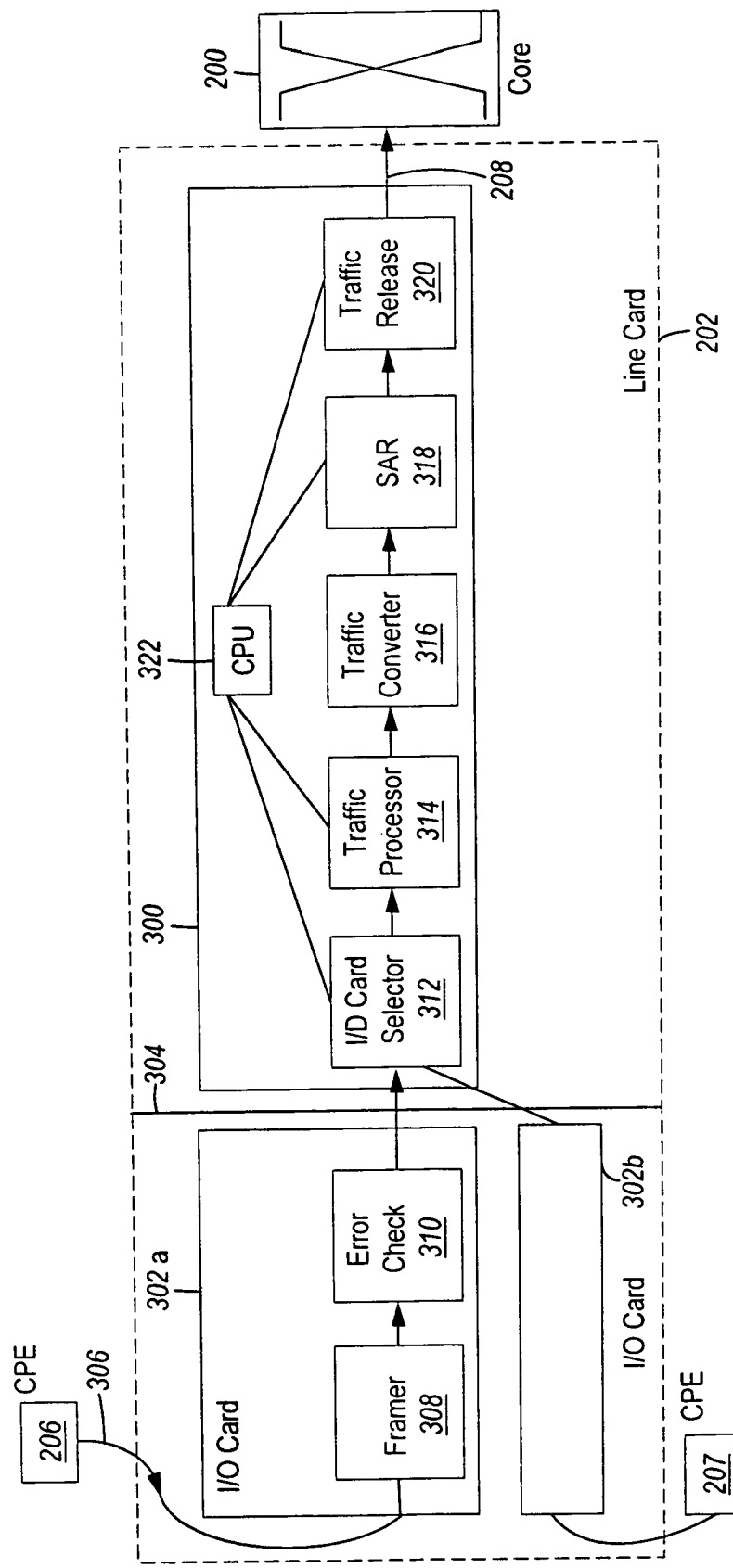
FIG. 3 is a block diagram of an input/output (I/O) card, a line card and a switching fabric of an input port of the network element of FIG. 2A.

Referring to FIG. 3, further detail on line card 202 is provided. In particular, line card 202 comprises line card 300, I/O cards 302A and 302B and midplane 304. Physically, midplane 304 provides a structural and electrical interface allowing line card 300 to plug into one side of midplane 304 and I/O card 302 to plug into another side of midplane 304. Internal signal tracks in midplane 304 connect specific pins from line card 300 to specific pins of I/O card 302, thereby allowing communication of signals and data therebetween. Multiple CPEs 102 connect to the I/O card 302 via the same optical connection. The CPEs 102 are mixed at their source with CPE 207. CPE 102A connects to I/O card 302A through optical connection 306. I/O card 302B provides another connection to line card 300 for the same CPE. Data provided from CPE 102A is transmitted upon optical link 306 through I/O card 302A. I/O card 302A processes the data and provides the data to line card 300 through midplane 304. Line card 300 receives the data from I/O card 302A, processes it and forwards the traffic to core 200 via HISL 208.

Further detail on each of the I/O card 302 and the line card 300 are provided below, using an example of a packet transmitted by CPE 102A. Initially, a packet is generated by CPE 102A and is transmitted along its optical link 306 to line card 302A. The packet is encoded in Packet Over SONET (POS) data. It will be appreciated that other encoding protocols may be used. The POS data is received at I/O card 302A at framer 308 which converts the serial POS data into parallel words of data. As the data is in packet form, it can be of variable length, which impacts the length of the parallel words of data. From framer 308, the parallel words of data, which collectively comprise a packet, are provided to error check module 310. An electrical signal encoding the parallel words of data is sent from error check module 310 across midplane 304 to line card 300.

At line card 300, the parallel words of data are received at I/O card 312. I/O card 312 provides automatic protection switching (APS). Accordingly, there would be a redundant set of I/O cards connected to line card 300. The I/O card selector would accept data from the operating I/O card. From I/O card 312, the data is provided to traffic processor 314 as a parallel stream of data.

Traffic processor 314 provides packet manipulation including header swapping on the data and policing of data transmission rate. In the embodiment, traffic processor 314 is a specialized communication processor from IBM, namely NP4GS3, known as IBM Power NP Network Processor, which utilizes a "Ranier" data format for encoding the packets, which is a proprietary IBM format. It will be appreciated that other processors and other formats may be used. The processor 314 converts the packet data into a number of cells, each being a 64 byte segment, having either 48 or 54 bytes of data therein with the remainder being header information. As mentioned earlier, a packet may comprise one or more cells. In the embodiment, the cells are the elemental data blocks which are sequentially transmitted with a minimum gap between cells. It will be appreciated that in other embodiments, other elemental data blocks may include packets.

From traffic processor 314, the data is provided to traffic converter 316. Traffic converter 316 receives the Rainer cells and retransmits them over the Utopia (Universal Test and Operating PHY Interface for ATM) bus (level 3) interface, which is a known industry standard, having a length of 64 bytes.

From traffic converter 316, the data is provided to SAR 318. SAR 318 provides ATM layer services, namely AAL5 segmentation and re-assembly (SAR). Additionally, SAR 318 provides ingress queuing and responds to backpressure from fabric 200 as part of the ingress queuing. SAR 318 provides one 256 K 64-byte shared memory packet buffer with per queue early packet discard (EPD) for congestion control. SAR 318 also converts cell formats from the format used by traffic processor 314 to another format for internal processing. SAR 318 internally converts the cell's format to another format having 48 bytes of data and 16 bytes of header information. The data is encapsulated in AAL5 format, for the embodiment; however, again, other formats may be used. SAR 318 provides regeneration of cells and a queuing point for cells received from CPE 102. It is also the initial discard point for cells for ingress transmission. SAR 318 also sets the definition for the cell, depending on the content of the header. The data can be transmitted in any one of AAL /0/1/3/4/5 format.

SAR 318 also provides the minimum gap shaping of cell traffic. Further detail on the shaper mechanism of the embodiment providing the minimum gap for the transmitted cells is provided later. Finally, SAR 318 generates traffic-regulated cells and releases them to traffic release module 320. The traffic release module 320 receives the Utopia-like data and transmits it to the core 200 over HSL 208.

Processor 322 in line card 300 provides housekeeping of all aspects of the I/O card selector 312, traffic processor 314, traffic converter 316, SAR 318 and traffic release modules 320.

Figure 4:
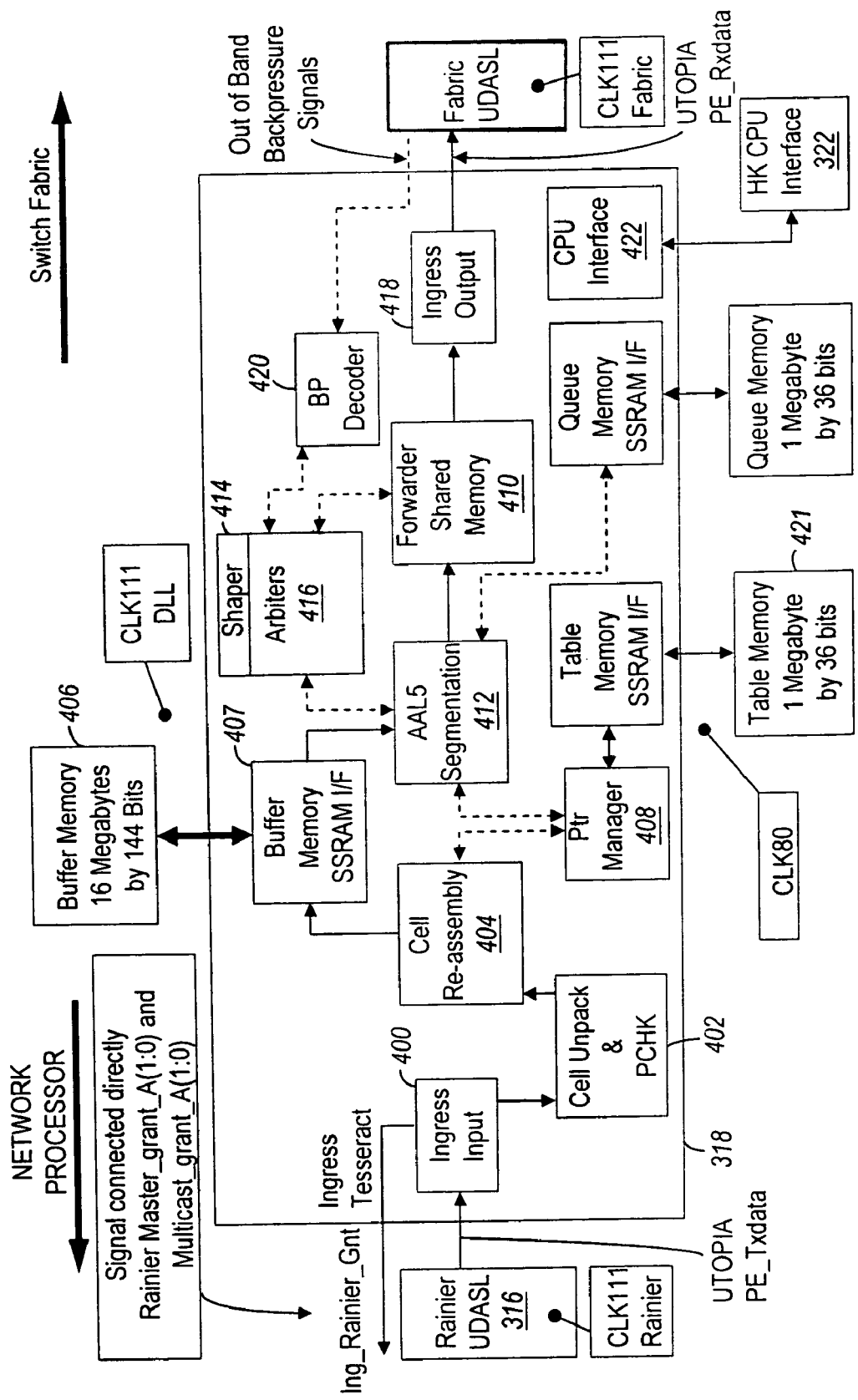
FIG. 4 is a block diagram of a cell traffic processing module of the line card of the network element of FIG. 3.

Referring to FIG. 4, further detail on SAR 318 is provided. As noted above, traffic converter 316 provides the Utopia-format data to SAR 318. Traffic converter 316 provides the data at a rate of 111 MHz to SAR 318. SAR 318 receives the data at ingress input module 400. Ingress input module 400 receives the cells and verifies that it is a Utopia-type cell by analyzing flag data accompanying the cell on the bus. From ingress input module 400, the cells are fed to cell unpack and FIFO module 402. The cells are transmitted from ingress input module 400 to cell unpack and FIFO module 402 at a lower clock rate of 80 MHz. Packed cells are unpacked and frames are written into separate buffers. The cells are provided to a FIFO queue (not shown). From the FIFO queue in module 402, cells are individually removed from the head of the FIFO queue and provided to cell re-assembly module 404. Cell re-assembly module 404 receives the individual cells from the FIFO queue in module 402, removes the headers from the cells, rebuilds the original packet and places the packet into buffer memory module 406.

The memory of buffer memory module 406 is logically organized to track 100 queues. The 100 queues comprise 32 sets of 3 queues which are each associated with a particular egress line card 204. Each set of queues for each egress line card 204 has three queues providing three levels of priority (high, medium, low). The contents of buffer memory module 406 include the data of the packet with revised header information for the ultimate destination line card. The memory is managed by pointer manager module 408 and controlled by buffer control module 407. As cells are removed from the FIFO in module 402 by cell re-assembly module 404, the packet is built up. Accordingly, SAR 318 must track when a series of transmitted cells constitutes a packet. After the packet is fully built, cell re-assembly module 404 notifies pointer manager 408 that the packet is ready to be sent.

Pointer manager 408 manages memory relating to the data portions for the built packets. The pointer manager 408 utilizes linked lists to track the number of packets available to be sent. The cell re-assembly module 404 utilizes information in the cell header of the cell in traffic processor 314 to identify the queue in which the cell will be reassembled. Cell re-assembly module 404 provides the information to pointer manager 408 which uses the information to manage the reassembled packets in the buffer memory 406.

As soon as cell re-assembly module 404 notifies pointer manager 408 that the end of a packet has been received, pointer manager 408 updates the context related to the packet to be an enqueued packet which is stored in table memory 421. Pointer manager 408 then advises arbiter 416 that a packet is available to be sent for segmentation.

Segmentation module 412 utilizes information from pointer manager 408 to examine the location of the transmittable cells. It also uses information passed to it from the previously stored context by pointer manager 408 to determine how the data is to be processed. To create a transmittable cell, it generates AAL5 cells from the packets stored in buffer memory 406. Again, other cell formats could be generated. In the embodiment, up to one hundred packets may be simultaneously segmented, one per queue. Arbitrators 412 dictate the segmentation priority for segmentation module 418. For each queue, a segmentation context is created and saved. When a start of a frame buffer is read from memory the external header information is extracted therefrom and stored in its respective context. The header information is used to generate the internal header for each AAL5 internal cell destined for the switch fabric.

Forwarder 410 receives the cell information and stores the cell information in its own internal memory. This memory is separate from the buffer memory described earlier. It is noteworthy that forwarder 410 can have backpressure on each cell queue indirectly by backpressure affecting its arbiter in arbitration module 416. From the forwarder 410, the cell information is provided to notify shaper 414 that a cell is available. Forwarder 410 holds three cells in its internal memory.

Arbitration module 416 selects a queue from which a cell should be sent every cell time, if cells are available. Again, every cell time a cell is sent (if available) and after a number of cell times collectively a packet would be sent. The arbitration module 416 output then provides queue information to forwarder 410 to allow it to forward a cell to output module 418. The shaper 414 is a submodule of arbitration module 416. The shaper 414 performs the rate calculation for the high priority queues of the arbiter. The shaper also has a calculator, per queue, which feeds its own Work Conserving Round Robin (WCRR) scheduler which, in turn, feeds the exhaustive arbiter of arbitration module 416. The WCRR scheduler of the shaper receives priority over all other queue requests from forwarder 410. This priority provisioning ensures that the defined intercell gap of high priority queues in the embodiment is maintained.

Output module 418 converts the transmission rate of the cell from the internal 80 MHz to 111 MHz and forwards it to the core 200.

Figure 5:
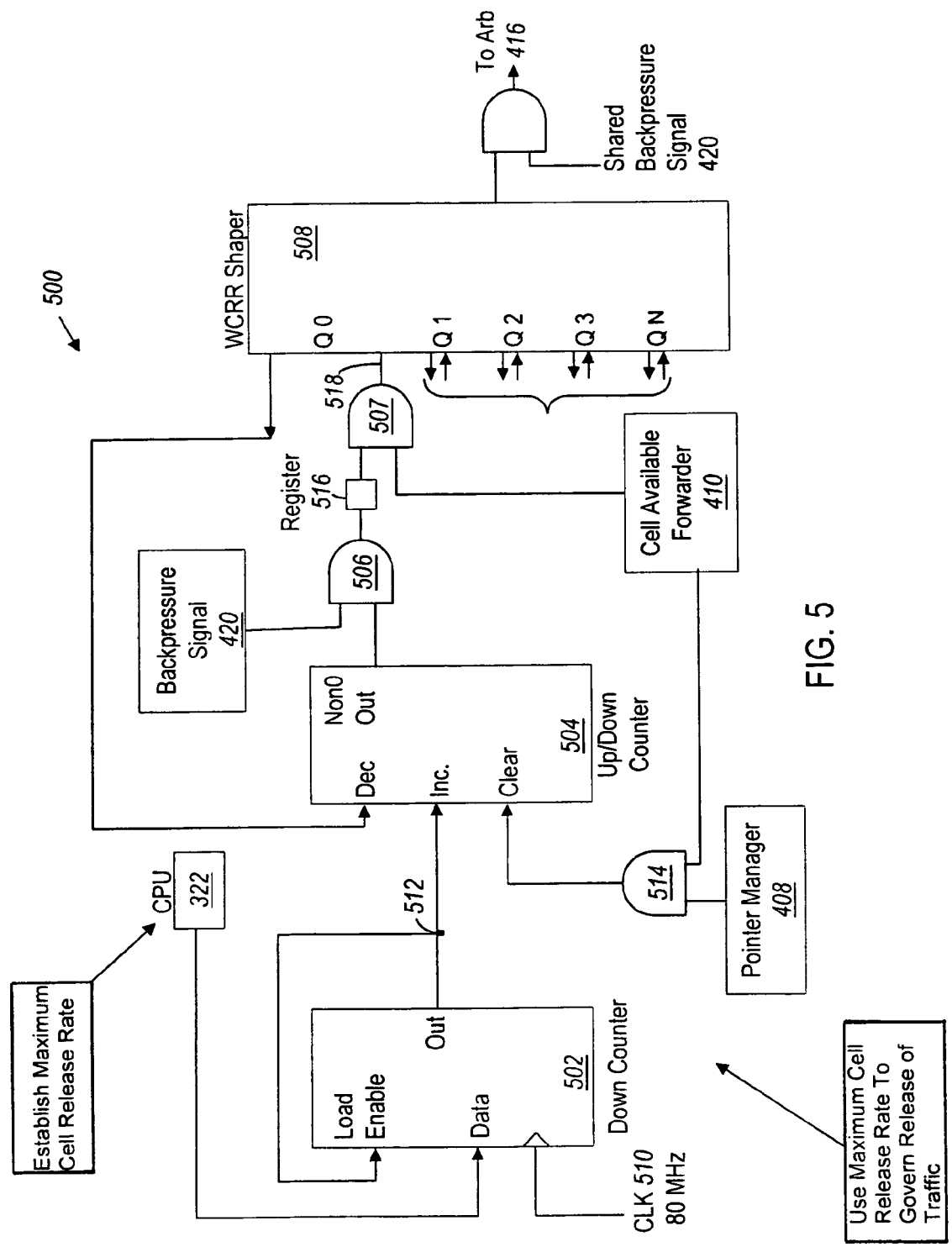
FIG. 5 is a block diagram of a traffic shaper of the cell traffic processing module of FIG. 4.

Further detail on the rate determining mechanism of shaper 414 is provided below. Referring to FIG. 5, shaper 414 uses a per queue circuitry coupled to a WCRR scheduler for scheduling transmissions from the queues and disabling transmissions during switch congestion. As noted earlier, the present embodiment utilizes 51 queues $Q_0, Q_1, Q_2, Q_3, \ldots Q_N$. Circuit 500 illustrates one queue $Q_0$ circuitry associated with one of the queues. Circuit 500 comprises a down counter 502, up/down counter 504, backpressure signal logic 506 and 507 and WCRR shaper 508. Circuit 500 also receives control inputs from CPU 322, pointer manager 408, forwarder 410 and clock generation 510. Clock generator 510 produces the 80 MHz clock signal used internally by shaper 414.

The embodiment provides a minimum gap between cells by using down counter 502, CPU 322 and clock signal 510. This contrasts with a system which does not provide minimum gaps between cell transmissions, where once cells are available, they would be released to the system without any moderation to their timing.

Software operating on CPU 322 monitors bandwidth requirements of its associated CPEs to its line card 300. It will be understood that references CPU 322 include the software operating thereon. Accordingly, CPU 322 determines an optimum minimum gap which should be provided between transmission of cells. Further detail on the calculation of the optimum minimum gap is provided below. For circuit 500, CPU 322 determines a "desired cell rate" which is used to govern the release of cells to ensure that cells have a minimum gap between adjacent cells. The cell rate is based, in part, on the desired throughput bandwidth, the internal clock of shaper 414 and the size of the cell. As a cell is fixed in size, the minimum gap is always maintained, as long as the release of the cells is consistently synchronized, in some manner, to the cell rate. The desired bandwidth in provided by the user of switch 108. For each CPE connection, the user assigns a particular bandwidth limit. CPU 322 tracks and sums the aggregate bandwidth requirements for each egress line card 204. Shaper 414 will restrict all of the CPEs transmitting to a particular egress line card to the desired aggregate bandwidth limit. Each egress line card 204 will have an independent bandwidth limit.

The overall cell rate signal related to the cell rate is generated by down counter 502, CPU 322 and clock signal 510. CPU 322 provides a preset to down counter 502 via its data register which is a value which will enable down counter 502 to generate the cell rate signal at the required frequency. The decrementing of down counter 502 is controlled by pulses in clock signal 510, connected to the clock input of down counter 502. Once sufficient pulses have been provided to down counter 502 to bring its internal count to zero, down counter 502 generates a high logic signal on its zero-output terminal. The output value of the output terminal is also fed to the load enable input of down counter 502. Accordingly, as soon as down counter 502 counts to zero, the preset value from CPU 322 is loaded into down counter 502. Thereafter, on the next clock pulse from clock signal 510, the internal count of down counter 502 is no longer zero and the signal on the zero-output terminal goes to a low logic level. Accordingly, a pulse is generated by down counter 502 which depends on the frequency of clock pulse 510 and the preset value provided by CPU 322. The pulse is the cell rate signal.

The cell rate pulse signal provides the timing mechanism ensuring that a minimum cell gap is provided for cells. However, the embodiment further utilizes the cell rate signal to produce a queue eligible signal to handle internal backpressure and simultaneous queue requests from other systems, while still maintaining a minimum cell gap between cells. To accomplish this, circuit 500 takes the cell rate signal and produces a queue eligible signal which has the same frequency characteristics of the cell rate signal, but selectively masks the pulses when a cell should not be released because backpressure or credits are present for cells that have not yet been enqueued in the forwarder.

To produce the queue eligible signal, up/down counter 504 is used. Up/down counter 504 is an asynchronous device which counts up and down by one depending on the presence of an activation signal on its increment and decrement input terminals. The non-zero output terminal produces a high logic signal when a non-zero count value is currently set in up/down counter 504. A clear input signal clears up/down counter 504; it is connected to a signal from pointer manager 408 which is ANDed with a signal from forwarder 410 at AND gate 514. The internal count value stored in up/down counter 502 indicates a credit of cells which have to be transmitted.

Every cell rate pulse signal increments up/down counter 504 and, in most cases, the output signal goes to a high logic level. The output signal is ANDed with a backpressure signal decoded from backpressure decoder 420 by AND gate 506. If there is no backpressure, a high logic signal is provided to its input on logic AND gate 506 and accordingly, AND gate 506 generates a high logic level output, which indicates that a cell is releasable. The signal is provided to WCRR shaper 508 to arbitrate amongst its managed queues. When WCRR 508 services the release of the cell, it sends notification of the release of the cell to the decrement input terminal of up/down counter 504. Accordingly, the internal count decreases by one, indicating that the previously released cell has now been transmitted. In the event of a backpressure signal, AND gate 506 causes the queue eligible signal to indicate that a cell cannot be released, i.e., the logic high level is suppressed. The logic value of AND gate 506 is held in register 516.

Meanwhile, every cell rate pulse signal increments the internal count in up/down counter 504. Accordingly, it is possible that the internal count is tracking the availability of cells which may not exist. For example, no cells may be in the queue, or the packet relating to the cells has been fully sent, and accordingly, no more cells are associated with it. In the latter case, pointer manager 408 and forwarder 410 indicate this state and in such circumstances produces a signal to cause up/down counter 504 to be cleared through AND gate 512. In the former case, the pointer manager 408 will still indicate that a portion of the packet remains to be transmitted; however, the forwarder 410 will not indicate this state. Therefore the credits are maintained and new credits can be added. The output signal from counter 504 is ANDed with the cell available signal from forwarder 410 by AND gate 507. If a cell is available, a high logic signal is provided to an input of AND gate 507, which causes AND gate 507 to generate a high logic level output at node 516, indicating that a cell is releasable. In the event that no cells is available in forwarder 410, forwarder 410 generates a low logic signal for the cell available signal. The low logic signal causes AND gate 507 to provide a queue eligible signal indicating that a cell cannot be released, i.e. the high level logic is suppressed.

CPU 322 ultimately sets the frequency of the cell rate pulse signal. CPU 322 knows the rate for each new connection. Accordingly, the user assigns a bandwidth to each connection, to ensure that for a particular connection, the transmission rate in bits per second is limited to a maximum value, which translates into a minimum gap between cells. CPU 322 translates the assigned bandwidth, aggregates it with the bandwidths of other connections, and programs an appropriate value into counter 502.

Referring to FIG. 6, a timing diagram showing the cell transmission aspects of shaper 414 is provided. There are five signals in FIG. 6. Clock signal 600 provides the system clock for the SAR 318. It is a periodic digital clock signal. Counter pulse signal 602 is generated from down counter 502 at node 512. Queue eligible signal 604 is the resulting signal generated at node 518 which, when enabled, indicates that there is no local backpressure associated with the datastream and that this particular queue meets all transmission criteria for sending a cell into the fabric for queue circuit 500. It provides a limited cell release rate for the line card. Output signal 606 is the ultimate cell encoded data released from output block 418 if queue eligible signal 604 is asserted and shaper 508 selects the queue associated with shaper 414.

Assuming that the count value loaded by CPU 322 is 2, for down counter 502, on each clock pulse, down counter decrements from 2 down to zero. On the zero count value, counter 502 generates a cell counter pulse 602. Assuming that backpressure decoder 420 (FIG. 4) does not generate a backpressure signal, pulse 608 is generated in queue eligible signal 604, which was initiated, in part by the pulse on cell counter pulse signal 602. The pulse on queue eligible signal 604 in turn causes scheduler to release its cell 610 noted by arrow 612. Upon completion of transmission of the cell, there is a minimum cell gap time noted by space 614. The intercell space 614 is fixed as cells are fixed in size relative to the clocking signal 600. Continuing to time 616, it is presumed, for this example, that an internal backpressure signal has been generated, so no queue eligible signal is generated.

In the embodiment, traffic is queued based on the egress line card 204. There are sets of queues for each egress line card 204. Multiple CPEs 102 may direct traffic to the same egress line card 204. The shaper 508 is used to shape all traffic directed towards a particular egress card 204. Accordingly, the cumulative output data stream 606 for the egress line cards may be like output stream 618, where traffic to egress line cards 204A, 204B and 204C are is being shaped by the embodiment. In circuit 200, for egress line card 204A, the count value in counter 502 is set to enable a cell to potentially be available for transmission to egress line card 204A every 2 cell times. Similarly for egress line card 204B, another circuit 200 has its counter 502 set to enable a cell to be potentially be available for transmission to egress line card 204B every 4 cell times. If a cell is available for transmission for both egress line cards 204A and 204B at the same time, the embodiment uses a round-robin scheme to select the card that will be serviced. It will be appreciated that traffic provided to an egress card 204 may include traffic from CPEs 102A, 102B and 102C. Each egress line card 204 will receive its own intercell gap for its own traffic (as the ingress card generates the gap) and when the cumulative traffic is combined, during the presence of an intercell gap for one stream of traffic for a given egress line card 204, traffic from another egress card 204 is inserted therein. For the illustrated example in data stream 618, egress card 204A has a minimum intercell gap of one cell per gap 614A and egress line card 204B has a minimum gap of three cells per gap 614B.

It is notable that in a packet-based system, a different mechanism would have to be used to ensure that the minimum gap is respected. The varying size of packets would need to be considered when providing the preset values for counter 502.

Processor 322 has access to information on the status of existing connections, the appearance of new connections, and the requested rates for each connection. Processor 322 sums the bandwidth requested per destination queue and determines a transmission rate for each queue utilizing the known maximum egress transmission rate. The sum of the transmission rates for all the queues should be lower or equal to the known maximum transmission rate, in order to reduce the possibility of backpressure signalling. The processor 322 apportions the available bandwidth (determined by the maximum transmission rate) to a desired bandwidth value for each ingress line card queue. Additional factors related to the transmission rate at each queue include the size of the data in bytes in a cell, the internal processing clock of the shaper 415 and the overall transmission rate. Accordingly, to establish a preset value for a given down counter 502, CPU 322 may utilize the following formula:

$$\text{Preset value} = \frac{[\text{\# bits/byte} \times \text{\# bytes/cell} \times \text{internal clock speed}]}{\text{Desired Bandwidth (bits/s)}} - 1 \quad \text{(Equation 1)}$$

The subtraction of 1 is an offset value for down counter 502 to trigger the signal on a zero value.

From the above description, it will be seen that the embodiment describes a system providing a minimum gap between cells. The embodiment provides a simple circuit which may be implemented in FPGA.

It is noted that those skilled in the art will appreciate that various modification of detail may be made to the present embodiment, all of which would come within the scope of the invention.

We claim:

1. A method for controlling timing of release of traffic provided to a communication switch including a switch fabric through at least one ingress port and being directed to a common egress port of said communication switch, said traffic comprising a plurality of datastreams for each said at least one ingress port and stored in respective queues, said method comprising:
   (a) for each said datastream:
      (i) establishing a maximum cell release rate to said switch fabric for said datastream;
      (ii) deriving from said maximum cell release rate and a clock rate for a clock signal a preset count value representative of a minimum gap between cells in said datastream upon release of said cells to said switch fabric;
      (iii) loading said preset count value into a first counter as a current count value;
      (iv) decrementing said current count value in said first counter in response to said clock signal;
      (v) incrementing a current count value in a second counter and resetting the current count value in said first counter to said preset count value when the current count value in said first counter reaches zero;
      (vi) determining whether said egress port is congested; and
      (vii) if said egress port is not congested and the current count value in said second counter is not zero, making a cell available for release to said switch fabric;
   (b) scheduling transmission of said available cells from each one of said plurality of datastreams to said switch fabric; and
   (c) decrementing the current count value in said second counter of a particular one of said plurality of datastreams when a cell is released from that particular datastream to said switch fabric.

2. The method of claim 1 wherein each said cell contains a number of bits, and said deriving said preset count value comprises dividing a product of the number of bits per cell and said clock rate for a clock signal by said maximum cell release rate and subtracting one from the result of said division.

3. The method of claim 1 wherein said egress port has a maximum egress transmission rate, and further comprising, for each said datastream, determining said maximum cell release rate, such that a sum of the maximum cell release rates for said at least one does not exceed said maximum egress transmission rate.

4. The method of claim 1 wherein said determining whether said egress port is congested further comprises monitoring a backpressure signal for said egress port.

5. A circuit for controlling timing of release of traffic provided to a communication switch including a switch fabric through at least one ingress port and being directed to a common egress port of said communication switch, said traffic comprising at least one datastream for each said at least one ingress port, said circuit comprising:
   (a) for each said datastream:
      (i) a first counter;
      (ii) a module for determining a preset count value from a maximum cell release rate and a clock rate for a clock signal and loading said preset count value as a current count value into said first counter, said preset count value representing a minimum gap between cells derived from said datastream upon release of cells to said switch fabric;
      (iii) a module for decrementing the current count value in said first counter in response to said clock signal;
      (iv) a second counter;
      (v) a module for incrementing a current count value in said second counter and resetting said first counter to said preset value when the current count value in said first counter reaches zero;
      (vi) a module for determining whether said egress port is congested; and,
      (vii) a release module for, if said egress port is not congested and the current count value in said second counter is not zero, making a cell available for release to said switch fabric;
   (b) a scheduler for the transmission of available cells from each of said datastreams to said switch fabric; and
   (c) said release module decrementing said current count in said second counter of a particular datastream of said at least one datastream when a cell therefrom is released to said switch fabric.

6. The circuit of claim 5 wherein wherein said cell contains a number of bits and said module for determining said preset count value includes a module for dividing a product of a number of bits per cell and said clock rate for a clock signal by said maximum cell release rate and subtracting one from the result of said division.

7. The circuit of claim 5 wherein said egress port has a maximum egress transmission rate and further comprising, for each said datastream, a module for said maximum cell release rate such that a sum of the maximum cell release rates for said at least one datastream does not exceed said maximum egress transmission rate.

8. The circuit of claim 5 wherein said module for determining whether said egress port is congested further comprises a module for monitoring a backpressure signal for said egress port.

9. A queue circuit for controlling transmission rate of a datastream at an egress port of a communication switch, said datastream received in a queue at an ingress port, said circuit comprising:
   means for establishing a desired cell rate for said datastream based on a minimum gap between cells in said datastream, and deriving from said desired cell rate a preset value;
   a down counter for generating a cell rate pulse based on said preset value and a clock signal;

an up/down counter for maintaining a cell rate provided by said cell rate pulse during congestion at said egress port;

a shaper for the transmission of a cell from said queue to said egress port at each cell rate pulse; and, a forwarder for indicating that a cell is available in said queue, and providing said cell to said shaper;

wherein said preset value is calculated according to a type of said cells in said datastream, a current bandwidth of said egress port, a maximum egress transmission rate of said egress port, and said desired cell rate.

10. The queue circuit of claim 9, further comprising a backpressure decoder for generating a backpressure signal that disables transmission of a cell from said queue during congestion at said egress port.

11. The queue circuit of claim 9, wherein said up/down counter maintains a credit value indicative of a number of cells that were not transmitted from said queue during congestion.

12. The queue circuit of claim 11, wherein said credit value is obtained as a difference between said cell rate pulses received from said down counter and a decrement signal from said shaper indicating successful transmission of a cell.

13. A method of scheduling the transmission of cells into a communication switch including a switch fabric, wherein said cells arrive at said communication switch in a plurality of queues, comprising:

defining for each of the plurality of queues a minimum time period corresponding to a maximum release rate at which cells from that queue can be released into said switch fabric;

for each of said plurality of queues generating a timing signal at the expiry of said minimum time period;

maintaining a current count value in a counter for each of the plurality of queues, said current count value in said counter determining the number of said cells in that queue eligible for release to said switch fabric;

changing said current count value in said counter at the expiry of each said minimum time period to indicate an extra cell eligible for release to said switch fabric;

determining whether said switch fabric is in a predetermined congestion state;

scheduling the transmission of cells from each of said queues and releasing a cell from each scheduled said queue when the current count value in said counter meets a predetermined condition indicating the eligibilty of cells for release to said switch fabric from that queue and when the switch fabric is not in said predetermined congestion state; and upon release of a said cell into said switch fabric, changing said current count value in said counter to indicate one less cell eligible for release to said switch fabric from that queue.

14. A method as claimed in claim 13, wherein said counter is an up/down counter, which is incremented at the expiry of each said minimum time period and decremented each time a cell is transmitted to said switch fabric.

15. A method as claimed in claim 14, wherein said predetermined condition is a non-zero value of said current count.

16. A method as claimed in claim 14, wherein expiry of each said minimum time period is determined by an additional counter which, on expiry of said minimum time period, outputs said timing signal and is reset.

17. A method as claimed in claim 13, wherein a sum of the maximum release rates for each of said plurality of queues is equal to an aggregate bandwidth limit for a particular ingress port of the switch fabric.

* * * * *